May 11, 1965 F. P. SHARPE 3,182,484
WORK HANDLING DEVICE FOR ANNULAR WORKPIECES
Filed Feb. 12, 1962 5 Sheets-Sheet 1

INVENTOR.
Frederick P. Sharpe.
BY
Harness, Dickey & Pierce
ATTORNEYS.

United States Patent Office 3,182,484
Patented May 11, 1965

3,182,484
WORK HANDLING DEVICE FOR ANNULAR
WORKPIECES
Frederick P. Sharpe, Dearborn, Mich., assignor to Kelsey-
Hayes Company, Romulus, Mich.
Filed Feb. 12, 1962, Ser. No. 172,702
18 Claims. (Cl. 72—393)

This invention relates to apparatus for transferring a workpiece from a conveyor line to a work station in a predetermined position, and more particularly to work transfer mechanism for moving a workpiece into a welding press in a predetermined position having exact alignment of surfaces to be welded.

The invention relates specifically to the manufacture of vehicle wheels, or the like, wherein an annular rim band is formed from a strip of sheet metal. The annular rim band is conventionally formed in a roll press into a substantially cylindrical shape having open ends which are subsequently welded to form a continuous band. The open ends of the sheet of material do not acquire any exact predetermined relationship relative to one another during the roll forming operation except that the open ends are located relatively closely adjacent one another after the roll forming. The ends of the formed cylinder may have a partial abutting relationship, an overlapped relationship, or a spread relationship after the roll forming operation depending on the accuracy of the roll forming machine, the amount of spring-back, and other factors. In order to obtain a satisfactory weld between the open ends of the cylinder, the ends must be precisely aligned relative to one another. In previous practice, the roll-formed rim bands have been manually fed into a welding press by a press operator. The press operator aligned the open ends of the rim in a particular relationship relative to the welding press and a fixture was provided in the welding press to obtain as accurate an alignment of the abutting open ends as possible. The welding operation was therefore time consuming and satisfactory results were not always obtained because of misalignment during the welding operation.

It is therefore an object of the present invention to provide automatic transfer mechanism for delivering a workpiece into a welding press in a predetermined position.

A further object of the present invention is to provide apparatus for automatically and accurately aligning the open ends of a cylindrically formed workpiece for a butt welding operation to form a continuous cylindrical rim. In this connection, it is an additional object of the present invention to provide apparatus for transferring a cylindrical workpiece which has been previously positioned and aligned for a welding operation into a welding press in the predetermined position.

Still another object of the present invention is to provide new and improved apparatus for separating the open ends of a substantially cylindrically formed band or rim.

Another object of the present invention is to provide new and improved workpiece gripping mechanism and, specifically, improved actuating mechanism for an "iron hand" device.

Other objects and advantages of the present invention will be apparent to those skilled in the art to which this invention relates by reference to the following detailed description of an illustrative embodiment of the invention and the accompanying drawings thereof wherein:

Figures 6, 7, 8, 9, 10, 11, 12:
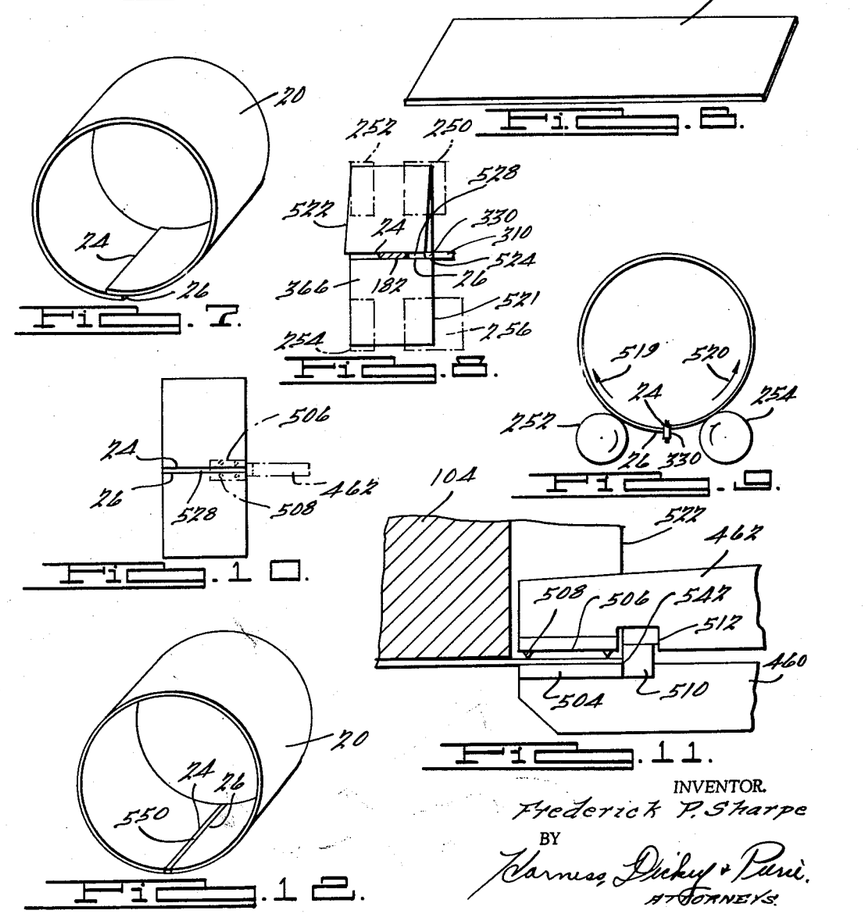
FIGURE 6 is a perspective view of a sheet metal blank prior to a roll forming operation.
FIGURE 7 is a perspective view of cylindrically formed band made from the blank shown in FIGURE 6.
FIGURE 8 is a diagrammatic view of a cylindrical band during alignment and positioning by the apparatus of the present invention.
FIGURE 9 is an end view of the apparatus shown in FIGURE 8.
FIGURE 10 is a diagrammatic view of a cylindrical band after alignment and positioning by the apparatus of the present invention.
FIGURE 11 is a partial sectional view taken along the line 11—11 in FIGURE 3.
FIGURE 12 is a diagrammatic illustration of a cylindrical band after a welding operation.

Referring now to FIGURES 6–7, the subject apparatus is designed for use with a substantially cylindrical band 20 which may be roll-formed from a flat metal sheet 22 or the like, and is provided with closely spaced end portions 24, 26. The end portions 24, 26 may have an overlapping relationship as shown, a slightly spread or spaced position, or a partial abutting position. The relative positions of the ends 24, 26 may vary from band to band and the end portions will not generally tend to be aligned. The most likely relationship is the overlapped one due to spring-back of the material after the roll-forming operation. The present invention is directed to apparatus for transferring the roll-formed bands 20 into a welding press in a predetermined position and with exact alignment of the end surfaces 24, 26.

Figure 1:
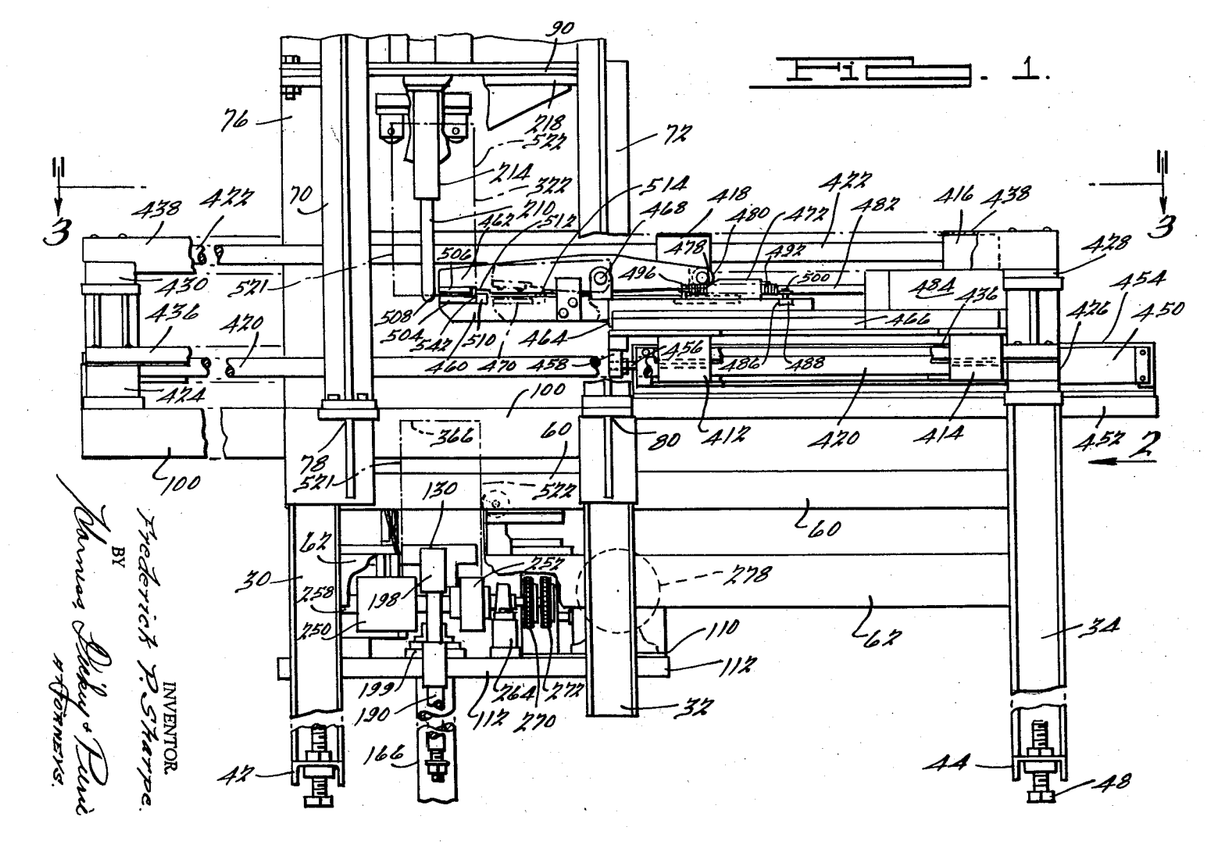
FIGURE 1 is a side elevational view, with parts broken away, showing the illustrative embodiment of the present invention.
Figure 2:
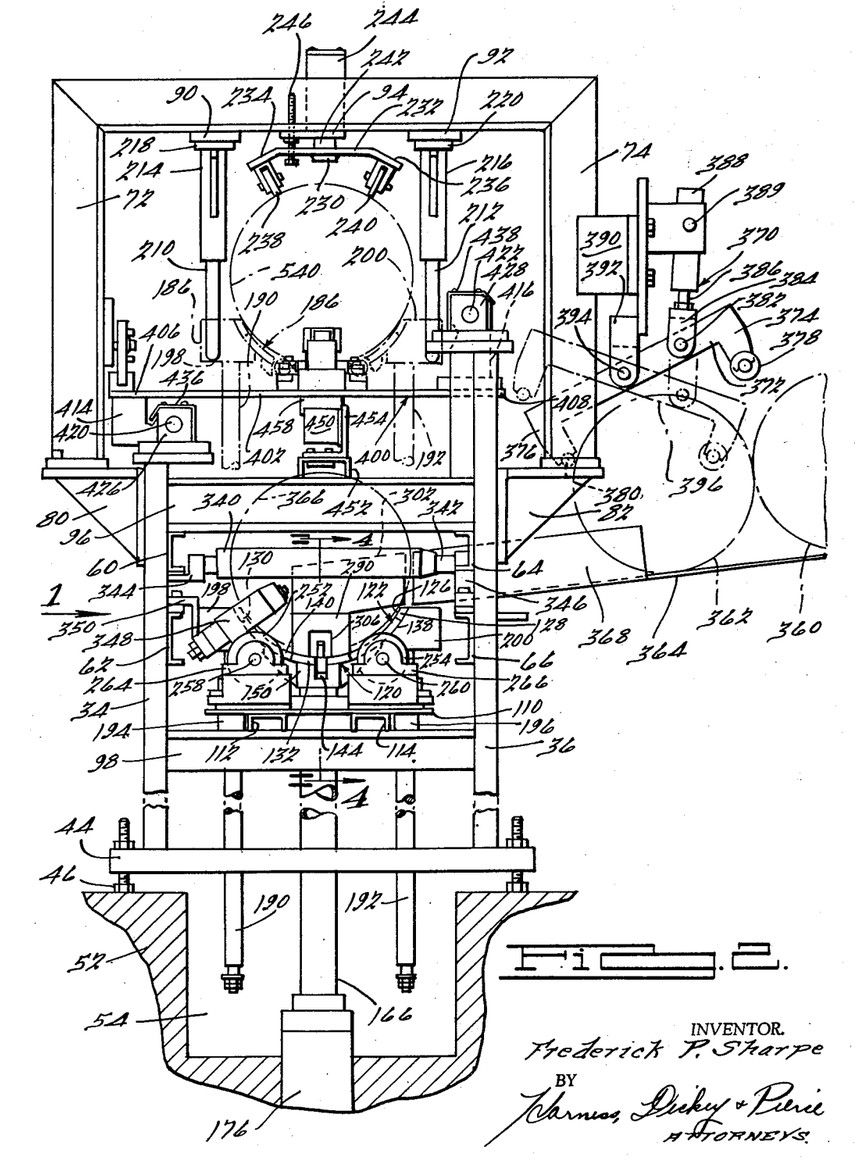
FIGURE 2 is an end view of the apparatus shown in FIGURE 1 with portions removed.
Figure 3:
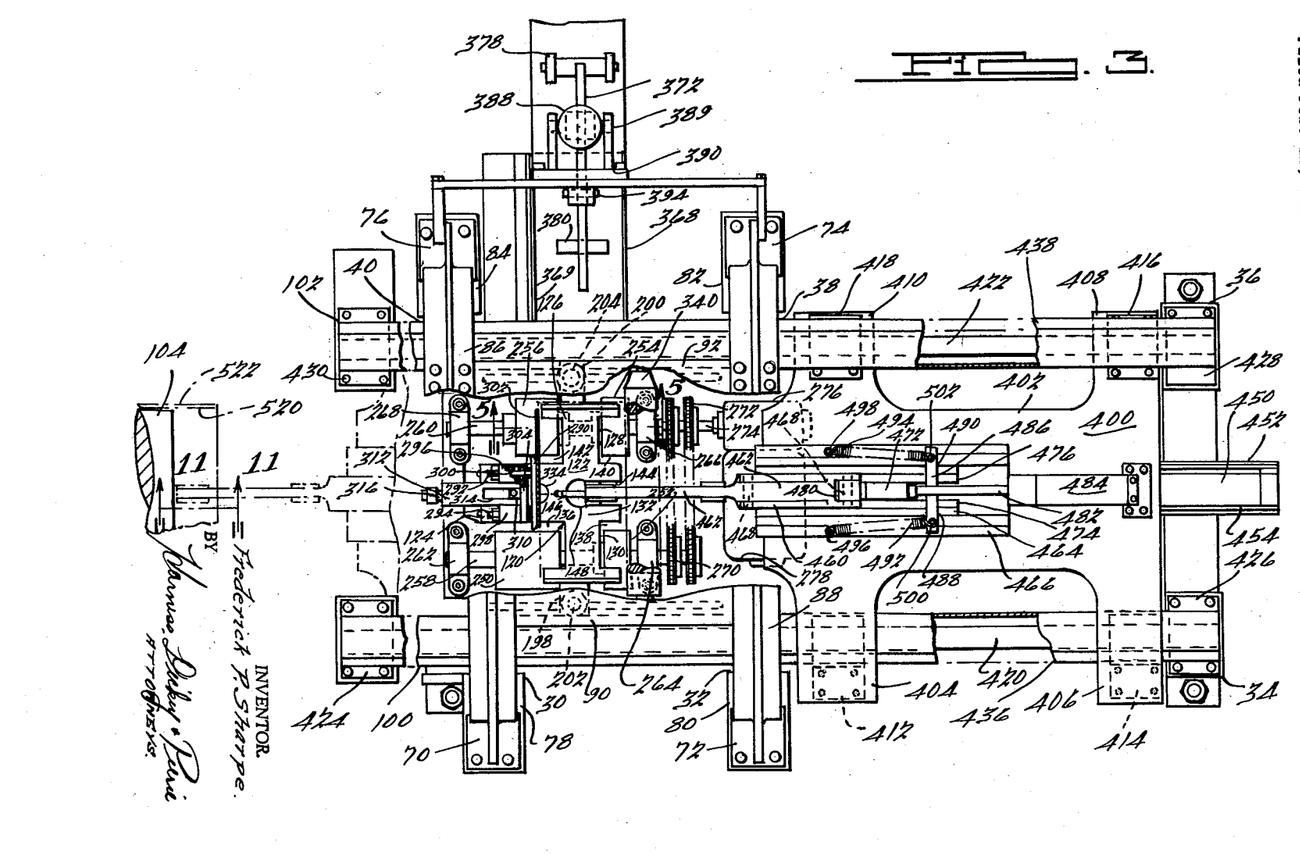
FIGURE 3 is a plan view of the apparatus shown in FIGURE 1 with parts broken away.

Referring now to FIGURES 1, 2 and 3, the band transferring apparatus comprises, in general, a lower frame formed from conventional structural members and including spaced vertical support pillars 30, 32, 34, 36, 38, 40. The pillars 34, 36 and 30, 40 are connected by cross support members 42, 44 having adjustable foot means 46, 48 provided on each end thereof and adapted to engage floor means or the like 52. The frame may be supported, in part, over a pit 54 for a purpose to be hereinafter described. The lower frame is further composed of longitudinally extending members 60, 62, 64, 66 which extend between the support pillars.

An upper frame comprises spaced vertical pillars 70, 72, 74, 76 mounted on support brackets 78, 80, 82, 84. Cross beams 86, 88 connect the upper vertical pillars 70, 76 and 72, 74 respectively. The cross beams 86, 88 are connected by longitudinally extending beams 90, 92, 94. As shown in FIGURE 2, the lower frame is further provided with suitable horizontal cross braces 96, 98. In addition, a pair of longitudinally positioned beams 100, 102 project outwardly from one end of the frame toward a welding press 104 which is illustrated schematically in FIG. 3.

Means for positioning and aligning the bands is supported on the lower frame by a plate 110 and a pair of cross beams 112, 114. The positioning and aligning apparatus comprises a cradle portion 120 which is substantially T-shaped in plan elevation, as seen in FIG. 3 and comprises a band receiving and supporting portion 122 and a longitudinally extending support plate portion 124. The portion 122 has a substantially semi-cylindrical upper surface 126 which is defined by upwardly extending T-shaped wing portions 128, 130 and a central connecting portion 132. Each of the wing portions 128, 130 defines roller shots 136, 138, 140, 142.

Figure 4:
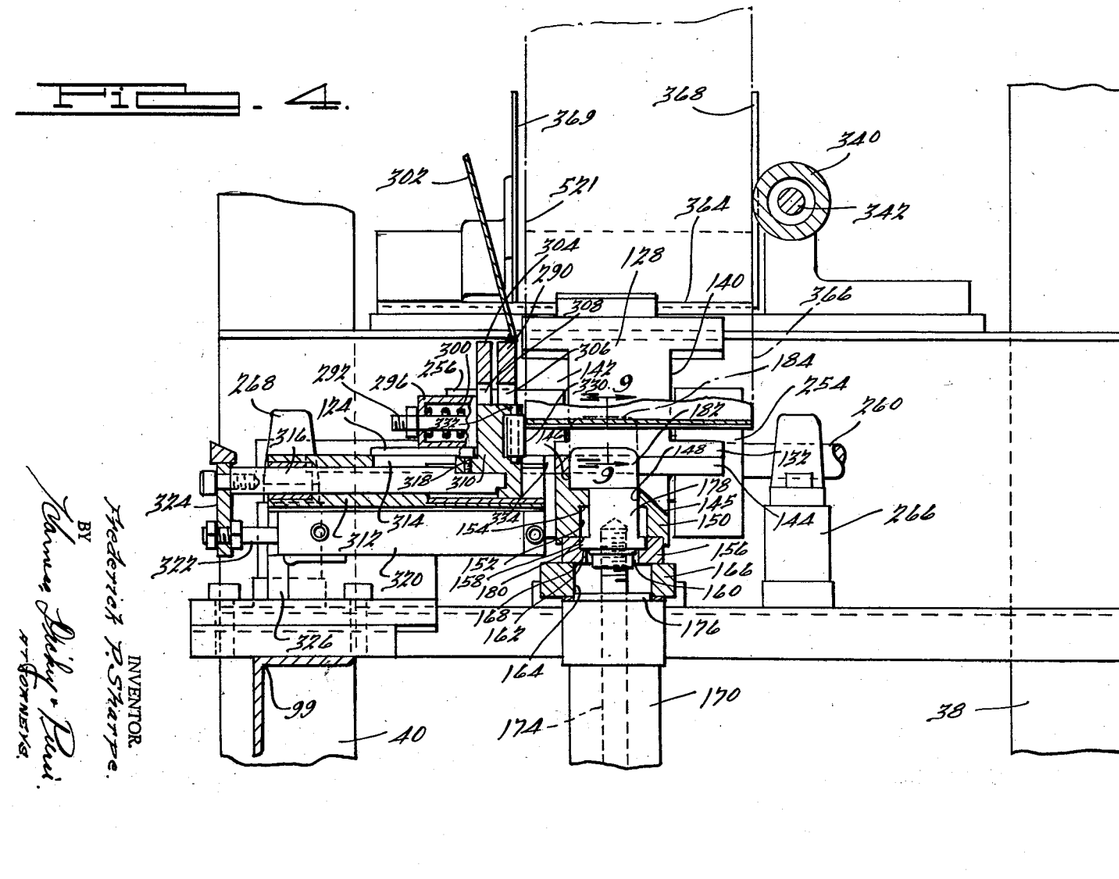
FIGURE 4 is a sectional view taken along the line 4—4 in FIGURE 2.

In addition, the central portion 132 is provided with a jaw slot 144 having an inclined approach surface 145 and being open at one end, and a centrally located blade slot 146. A central bore 148 connects the jaw slot and the blade slot, and extends downwardly into a housing 150 as shown in FIGURE 4. An enlarged continuation 152 of the bore 148 is formed in the housing 150 and defines a shoulder 154. A connecting block 156 is provided with an upper bore 158 which forms a continuation of the bore 152 and a lower smaller bore 160 which defines a shoulder 162. A bore 164 in a plate 166 defines a shoulder 168. A tube 170 containing a piston rod 174 of an air cylinder 176 mounted in the pit 54 communicates with the bores 148, 152, 158, 160, 164. A collar 177 is secured to the piston rod 174 and is slidably received within the bore 164.

A shaft member 178 is slidably mounted in the bore 148 and is connected to the end of the piston rod 174 by any suitable means. A flange 180 on the lower end of the shaft 178 is adapted to abut the shoulder 162 in a lower position and the shoulder 154 in an upper position. Similarly, the collar 177 is adapted to abut the shoulder 168 in the extended position of the piston rod. A blade element 182 is secured to the end of the shaft 178 and is slidable between the lowered position, shown in FIGURE 4, within the slot 146 and bore 148, and an extended position shown in phantom at 184. In the extended position, the blade extends upwardly through the slot 146 and bore 148 to a position substantially above the upper surface 126 of the cradle means.

The piston rod 174 provides elevator means adapted to extend and elevate the entire cradle assembly once the flanges 177, 180 have engaged the shoulders 154, 168. Referring now to FIG. 2, the cradle assembly is shown in its elevated position in phantom at 186. The elevator means further comprises a pair of guide rods 190, 192 provided to guide movement of the cradle assembly to and from the extended position. The guide rods 190, 192 are slidably received within guide bushings 194, 196 which are fixedly secured to the frame. The upper ends of the guide rods 190, 192 are secured to the wing portions 128, 130 of the cradle in bushings 198, 200 provided therebeneath. The guide blocks 198, 200 further provide guide holes 202, 204, shown in FIG. 3, which are adapted to receive guide pins 210, 212 in the extended position of the cradle. The guide pins 210, 212 are supported by sleeve elements 214, 216 which are securely fastened to the cross beams 90, 92 by base plates 218, 220.

An adjustable stop or abutment means 230 is mounted on the upper frame between the guide pins 210, 212 and comprises a base plate 232 having downwardly inclined end portions 234, 236 on which roller elements 238, 240 are mounted at right angles to the periphery of a cylinder having a diameter equal to the outside diameter of the bands. The base plate 232 is connected to a shaft 242, which is reciprocably received in a bracket 244. An adjusting screw 246 is provided to vary the vertical position of the rollers 238, 240 as desired.

Figure 5:
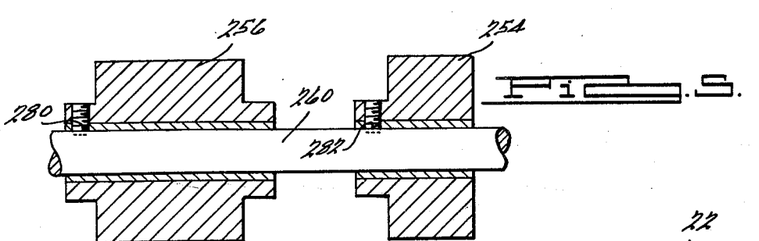
FIGURE 5 is a partial sectional view taken along the line 5—5 in FIGURE 3.

Automatic band positioning and aligning means are associated with the cradle assembly in its lower position to accurately locate and align the open ends of the band in a predetermined manner. As shown in FIG. 3, positioning means comprises spaced roller elements 250, 252, 254, 256 which are mounted on spaced longitudinally extending shafts 258, 260. The shafts 258, 260 are rotatably supported in spaced pillow blocks 262, 264, 266, 268. The upper portions of the rollers are received within the slots 136, 138, 140, 142, respectively, and protrude upwardly through the slots beyond the inner peripheral surface 126 of the cradle a distance sufficient to contact and support the bands thereabove when the cradle is in its lowermost position. The shafts 258, 260 are connected through sprocket and chain drive means 270, 272, a drive shaft 274, a conventional speed reducer unit 276 to conventional motor means 278. The rolls 254, 256 are magnetic and are keyed to the shaft 260 as indicated at 280, 282 in FIG. 5. The roll 252 is also magnetic but the roll 250 is not. The rolls 250, 252 are in the form of idler rolls and are freely rotatably supported on the shaft 258.

Means for aligning the sides of the bands in the form of a spring mounted backup plate is associated with the cradle assembly. The plate is slidably mounted on the longitudinally extending portion 124 of the cradle and comprises a vertically extending plate member 290 having a pair of guide shafts 292, 294 extending longitudinally through spaced support blocks 296, 298 which are adjustably fixed to the support 124 in a conventional manner by a bolt and slot arrangement. Nut means may be provided on the ends of the shafts 292, 294 to limit displacement of the plate 290 relative to the blocks 296, 298. Compression spring means 300 are associated with each of the blocks and shafts to bias the plate 290 toward the cradle. Consequently, the plate 290 is resiliently movable rearwardly against the compression springs under load. A guide plate 302 is welded or otherwise secured to the top of plate 290 and forms an extension thereof. A stop plate 304 extends parallelly to the backup plate 290 and connects the blocks 296, 298.

Referring now to FIGURES 3 and 4, the plates 290, 304 are centrally slotted at 306, 308. Wedging means comprising a wedge blade 310 is slidably received within the slots 306, 308 between the pin housings 296, 298 in a longitudinal sleeve 312. The sleeve 312 is provided with a longitudinally extending slot 314 along its upper side which accommodates reciprocable movement of the wedge means 310. A shaft 316 is slidably mounted in the sleeve 312 and connected at one end to the wedge blade 310 by a key element 318. The shaft 316 is reciprocable by an air cylinder 320 which is mounted therebelow and connected thereto by a piston rod 322 and linkage 324. The air cylinder 320 and the sleeve 312 are secured to the frame in any suitable manner such as by bracket means 326. The forward edge of the wedge means is formed by a roller 330 which is rotatably mounted on a pin element 332 in the end of the wedge blade 310 and protrudes outwardly beyond the forward edge thereof for engagement with a side surface of the bands. The wedge 310 and roller 330 are movable relative to the cradle by the provision of an accommodating slot 334 in the adjacent edge of the central portion 132 of the cradle.

The workpieces are additionally movably supported on the cradle assembly by the provision of a roller 340 which is rotatably mounted on a shaft 342 extending between support brackets 344, 346 which are suitably attached to the frame. An additional inclined roller 348 may be mounted on a bracket 350 at one side of the frame below the roller 340.

Referring now to FIGURE 2, the wheel rim bands are fed onto the cradle apparatus from a supply of bands 360, 362 on an inclined conveyor chute 364 to the position shown at 366. Guide plate means 368 may be provided along the chute to guide the bands onto the cradle. An escapement mechanism 370 is provided to feed the bands to the cradle assembly one at a time at predetermined intervals. The escapement mechanism comprises a pivot arm 372 having transversely extending end portions 374, 376. Transversely extending cylindrical pin elements 378, 380 are mounted on the end portions for engagement with the outer peripheral surface of the bands. The arm 372 is pivotally connected at 382 to a clevis member 384 which is connected to a piston rod 386 of an air cylinder 388. A bracket 390 pivotally supports the cylinder 388 and is suitably fastened to an adjoining portion of the frame. The arm 372 is additionally pivoted to a support bracket 392 at 394 for movement from the stop position shown in FIGURE 2 to the release position shown in phantom at 396.

Transfer means are provided to deliver bands from the cradle apparatus after the aligning and positioning operation thereof to a welding press with the proper position and alignment maintained. In general, the transfer means comprises a carriage mechanism and an iron hand device. The carriage mechanism comprises a carriage plate 400 having a central portion 402 and transversely extending leg portions 404, 406, 408, 410. The leg portions 404, 406 are provided with downwardly depending guide block members 412, 414 and the leg portions 408, 410, are provided with upwardly extending guide block members 416, 418. Guide and support rails in the form of rods or shafts 420, 422 extend longitudinally of the frame above and below the carriage 400 and are supported at their extremities in bushings 424, 426, 428, 430. Protective shields 436, 438 extend the length of the guide and support rails 420, 422 and form a protective covering on the top and inside surfaces thereof. The support blocks 412, 414, 416, 418 of the carriage 400 are received beneath the shields 436, 438 and are slidably movable relative thereto along the rails. The carriage plate 400 is reciprocable along the rails by means of an air cylinder 450 which is fixedly mounted beneath the carriage on frame members 452, 454. A piston rod 456 of the air cylinder 450 is connected through suitable linkage 458 to the carriage 400 so that extension and retraction of the piston rod 456 causes corresponding reciprocable movement of the carriage 400 along the guide rails.

An iron hand device comprising upper and lower jaw portions 460, 462 is provided to grip and carry rims from the cradle means to the welding press 104. The lower jaw member 460 is mounted on a movable slide block 464 which is slidably retained in guide means 466 fixedly secured to the top of the carriage plate. The upper jaw member 462 is pivotally movable relative to the lower jaw 460 about suitable pivot pin means 468 between the closed gripping position shown in FIGURE 1 and the open position shown in phantom at 470. The upper jaw is pivotally movable by means of a movable cam block 472 which is slidably mounted in suitable guides 474, 476 on the slide block 464 in a conventional manner. The cam block 472 is therefore movable relative to the carriage plate and relative to the slide block 464 and jaw elements. The cam block has an inclined front surface 478 which is adapted to engage roller means 480 provided on the rearward end of the upper jaw member 462. The cam block 472 is connected to a piston rod 482 of an air cylinder 484. The jaw assembly and slide block are adapted to be connected to the piston rod during a portion of the stroke thereof by means of a plate 486 which is fastened to the rear of the slide block 464 at 488 and 490. During a portion of the stroke of the piston rod the rear surface of the cam block abuts the front edge of the plate 486. In order to maintain the slide block 464 in positive engagement with the cam block, tension spring units 492, 494 are connected at one end to pin elements 496, 498 on the guide means 466 and at the other end to pin elements 500, 502 on the plate 486. When the spring elements are in a neutral untensioned position, as shown in FIG. 3, further forward movement of the cam block causes disengagement thereof from the plate 486. Consequently, the jaw assembly may be axially displaced before the cam block 466 moves the jaws to the closed gripping position. The forward ends of the upper and lower jaw members are provided with gripping plates 504, 506. Tooth elements 508 are provided on the upper jaw plate and the lower jaw plate is provided with a suitable back-up surface. An abutment plate 510 is provided at the rear of the lower plate 484 to abuttingly receive a side surface of the bands and is accommodated by a slot 512 in the upper jaw. Spring means 514 are located between the jaw members to provide a positive return to the open position.

In operation, wheel rim bands formed in the manner illustrated in FIGURES 6 and 7 are conveyed to the subject apparatus by suitable conveyor means and are delivered onto the downwardly sloping feed chute 364. The bands are adapted to roll down the feed chute and into abutting engagement with the escapement mechanism 370. The lead band 362 engages the transverse pin 380 on the rear of the pivotal arm 372 and is thereby retained in position on the feed chute. When a band is to be released, the air cylinder 388 is actuated to extend the piston rod 386 and rotate the control arm 372 to the position shown in phantom at 396 whereat the transverse pin 378 moves downwardly between the bands 362 and 360 to push the band 362 down the chute onto the cradle means and prevent further advancement of the band 360. The band 362 rolls down the chute between the guide plates 368, 369 and drops onto the cradle assembly between the plate 302 and the side rolls 340, 348. The band is supported on the rollers 250, 252, 254, 256 above the upper semi-cylindrical surface 126 of the cradle means as shown in FIGS. 2 and 4 at 366. The band is received by the cradle means in any random position relative to circumferential location. Consequently, the open ends 24, 26 of the band may be located at any position through 360°.

In order to properly orient and position the band 366 for the welding operation, the motor 278 is actuated to drive the magnetic rollers 254, 256 on shaft 260 through the drive shaft 274 and the chain and sprocket units 270, 272. The magnetic rollers drive the band in a counter-clockwise direction as viewed in FIGURE 2. The idler rollers 250, 252 are turned on the shaft 258 by rotative movement of the rim. The magnetic roll 252 creates a drag on the band and creates a force opposite to the force created by the magnetic rolls 254, 256. Consequently, as shown in FIGURE 9, opposite forces 519, 520 are created by the action of the magnetic rolls 252, 254 and 256. The opposite forces created by the magnetic rolls and indicated by the arrows 519, 520 tend to radially expand the rim and separate the open ends 24, 26. The guide rollers 340, 348 facilitate rotative movement of the band by and on the rollers during the positioning and orienting phase of the operation.

At the same time that the rollers are actuated, the air cylinder 320 is also actuated to retract the piston rod 322 and displace the wedging means 310 and roller 330 inwardly against the side surface 521 of the band 366. A constant continuous pressure is exerted against the side of the band by the action of the air cylinder 320 through the roller 330. In addition to causing a separation of the ends 24, 26 of the rim, the magnetic rolls also cause an axial displacement and misalignment of the side edges 521, 522 of the band as shown in FIGURE 8. The skewing or misalignment is effected because of the use of three magnetic rollers to create a force unbalance. Consequently, the force application to the band as it is rotated by the magnetic rollers varies in direction and also intensity since there is little or no drag created by the roller 250. As the axial displacement of the edges relative to one another occurs, the roller 330 will be received within the pocket or abutment formed at 524 by the distortion of the band. When the roller, which is constantly biased inwardly by the air cylinder 320, is extended into the abutment between the ends 24, 26 the rotation of the band is prohibited and the magnetic rollers thereafter cause further displacement of the end portions 24, 26 until the roller element 330 is located completely within a slot 528 defined by the spread ends 24, 26 of the band.

After a predetermined time interval, sufficient to allow the band to be located on the cradle means with the ends 24, 26 at the bottom and in a radially expanded condition to define the slot 528, the air cylinder 176 is actuated to extend the piston rod 174. The initial movement of the piston rod 174 axially extends the blade 182 upwardly through the bottom of the cradle and into the slot 528 between the ends 24, 26 of the band. Upward displacement of the blade 182 relative to the cradle is terminated when the flanges 177 and 180 abut the shoulders 154, 168. Thereafter, further upward movement of the piston rod 174 causes displacement of the entire cradle assembly upwardly relative to the frame. As the cradle assembly is moved upwardly, the band becomes seated on the cylindrical cradle surface as soon as the rollers clear the inner surface through the roller slots 136, 138, 140, 142. The spring-back effect of the expanded ends of the band causes a gripping action between the side edges 24, 26 of the band and the separating blade 182. Consequently, the band is securely held on the cradle and moves upwardly therewith in a predetermined position and has a predetermined orientation relative to the open ends 24, 26. The cradle is guided upwardly by means of the guide rods 190, 192 which are slidably received within the guide bushings 194, 196.

When the band reaches the position indicated at 540 in FIG. 2, the upper portion of the band is abuttingly engaged with the roller elements 238, 240 and a slight pressure is exerted between the band and the rollers by continued actuation of the air cylinder 176 so that the band will be flexed inwardly to assure completely uniform spacing of the ends 24, 26 along the slot 528 formed thereby. As the cradle reaches its upper position, the guide pins 210, 212 are received within the guide bushings 202, 204 to accurately locate the cradle.

At this time the air cylinder 484 is actuated to advance the iron hand device from the open retracted position, indicated at 470 in FIG. 1, to the extended closed gripping position shown therein. Actuation of the air cylinder 484 causes extension of the piston rod 482 and the cam block 472. The spring elements 492, 494, being under tension from the previous retracting stroke of the piston rod, cause displacement of the jaw unit slide block 464 relative to the guide block 466 as the piston rod is extended.

As the jaw unit is extended, the forward ends of the jaws are received within the slot 144 in the cradle with the jaw plates 504, 506 located above and below the surfaces of the band adjacent the open ends 24, 26. When the jaw unit is moved into position over and above the edge of the band, the side surface 522 of the band comes into abutting engagement with the abutment plate 510 at 542 in FIG. 1. The other side edge 524 of the band is displaced into abutting engagement with the resilient spring plate 290. The spring elements 300 associated with the plate 290 permit displacement thereof as the jaw means are brought into engagement with the band. In this manner any misalignment of the edges of the band adjacent to the end portions 24, 26 is corrected and the band becomes completely symmetrically aligned. Consequently, the slot 528 will have a uniform width throughout the length thereof. After the jaw apparatus has been positioned by the spring units, the cam block 472 continues to move forwardly until it engages the cam roller 480 and rotates the upper jaw 462 about the pivot 468 to bring the jaw plates 504, 506 into tight gripping engagement with the band on each side of the slot 528 immediately adjacent the open ends 24, 26.

When the band is securely clamped by the jaw means, the air cylinder 176 is actuated to retract the piston rod 174 and return the cradle assembly to its lower position. As soon as the cradle assembly has cleared the carriage path, the air cylinder 450 is actuated to cause extension of the piston rod 456 and cause sliding extension of the carriage plate 400 through the linkage 458. The carriage 400 is slidably supported on the guide rails 420, 422 and is carried thereon from the retracted position shown in FIG. 1 to a fully extended position shown in phantom at 520 in FIG. 3 whereat the band is positioned as shown at 522 over a support spindle 104 of a welding press. In this manner the band is positioned in the welding press in an exactly predetermined position and is oriented so that the weld 550 between the open ends 24, 26 of the band will be exactly uniform as shown in FIG. 12. The jaw means are released from the band in the press and the carriage is returned by actuation of the air cylinder 450 to the original position shown in FIG. 1. The jaw means are released from the band by actuation of the cylinder 484 which causes retraction of the cam block 472 and enables the spring device 514 provided between the jaw elements to open the jaws. As the cam block 472 is retracted, it engages the plate 486 and the spring elements 492, 494 are extended and the entire jaw assembly is carried rearwardly to the original position. The extension of the springs 492, 494 on the return stroke of the piston rod provides for the lost motion means between the cam block 472 and the slide block 464 during extension of the piston rod.

As soon as the cradle has been returned to its lower position, the escapement mechanism is again actuated to release another band which rolls down the chute and is received on the roller elements for orientation. The sequence of operation of the apparatus is such that during the time interval required for extension and retraction of the carriage to deliver an oriented band to the welding press and return, another band is already on the cradle assembly and is being oriented. Therefore, as soon as the carriage is returned to its original position, another band has been properly oriented and the cradle assembly will be immediately elevated to the jaw gripping position. Accordingly, it will be seen that the operation of the unit is exceptionally fast and that the device can feed bands into the welding press in a predetermined position and with a proper orientation as fast as the bands can be welded. In other words, the length of time required to complete the weld in the welding press is approximately equal to the time required to deliver another band to the iron hand ready for delivery as soon as the welded band is removed from the press. The apparatus is operated in a conventional manner by conventional electrical and hydraulic controls. Since the controls are conventional and may be designed in a variety of ways by those skilled in the control art to obtain the desired results, none of the controls are shown or discussed.

It will be obvious to those skilled in the art of handling materials between work stations and of delivering workpieces for a manufacturing operation thereon, that the subject apparatus can be adapted for use in a variety of environments. Furthermore, the principles of the present invention are capable of use with structure having various modifications and rearrangements of the various parts. Accordingly, it is intended that the scope of this invention, as defined by the appended claims, include all embodiments incorporating the inventive principles herein disclosed except insofar as limited by the prior art.

What is claimed is:

1. In apparatus for transferring annular articles such as cylindrical bands having spaced discontinuous end portions to a work station in a predetermined manner and comprising: support means for rotatably supporting an article, rotation means for rotating an article on said support means, abutment means engageable with a rotating article for obtaining predetermined circumferential orientation of the article relative to said work station, alignment means for obtaining symmetrical alignment of the side surfaces of said articles, spacing means for obtaining symmetrical spacing of a predetermined width of the end portions of said articles, and article transfer means adapted to receive said articles in the oriented and aligned and spaced position and to deliver said articles to said work station in the oriented and aligned and spaced position.

2. Apparatus for obtaining a predetermined orientation of an annular article having open ends and comprising: cradle means movable between an article receiving position and an article discharging position and having a support surface adapted to receive and support said article during movement from the article receiving position to the article discharging position, roller means fixedly mounted relative to said cradle means and having portions spaced beyond said support surface in the article receiving position to rotatably drive and support said article, magnetic means associated with said roller means drive means for said roller means to radially expand said article and locate said open ends in a predetermined spaced relationship, and spacer means operable after radial expansion of said article to maintain said open ends in said predetermined spaced relationship.

3. The apparatus as defined in claim 2 and wherein said magnetic means are arranged to obtain axial as well as radial displacement of the open ends of said article.

4. Apparatus for symmetrically aligning the edges of an annular article having open ends after said article has acquired a predetermined orientation and comprising: means to exert radially directed forces on said article and radially inwardly flex said article to obtain parallel alignment of the open ends of said article, and means to exert axially directed forces on said article and axially displace the side edges of said article to obtain parallel alignment of the side edges.

5. The apparatus as defined in claim 4 and wherein said last mentioned means comprises a slidable abutment plate engageable with one side surface of said article, said abutment plate being spring mounted and resiliently movable inwardly against said spring, and movable abutment means provided on the other side of said article and being movable inwardly against the opposite side edges to apply axial pressure between said abutment plate and said abutment means until said side edges are parallelly aligned.

6. In work transfer mechanism comprising an iron hand or the like, jaw means operable between open and closed positions, means for causing movement of said jaw means as a unit in said open position from a retracted position to an extended position, cam means to close said jaw means in said extended position, said cam means and said jaw means being movable by a single air cylinder, a piston rod extending from said air cylinder, a cam block mounted on the end of said piston rod and being movably mounted relative to said jaw means and to said upper jaw unit, lost motion means connecting said cam means and said jaw means, said lost motion means permitting movement of said jaw means to said extended position as said cam means is extended by said piston rod and prior to engagement of said cam means with said upper jaw means, and said cam means being engageable with said upper jaw means after full extension of said jaw means to said extended position to move said jaw means to said closed position.

7. In apparatus for orienting and positioning an open ended annular workpiece for a welding operation to weld the open ends and form a continuous cylindrical article, feed means to deliver said open ended articles one at a time, combination elevator and orienting means to receive said articles from said chute means, article expanding means provided on said combination elevator and orienting means to radially displace the open ends of said article and form a gap therebetween, blade means associated with said combination elevator means and orienting means to locate said gap in a predetermined position relative to said combination elevator and orienting means and to maintain said gap after deactivation of said radial expanding means, means to elevate said combination elevator and orienting means and to elevate said annular article to a transfer position after orientation thereof, alignment means operable in said transfer position to obtain parallel alignment of the open ends of said article and the side surfaces thereof, and transfer means to remove said article from said combination elevator and orienting means and to maintain said article in said preoriented position and with said alignment during transfer to a work station.

8. The apparatus as defined in claim 7 wherein said combination elevator and orienting means comprises a substantially semi-cylindrical cradle, roller means associated with said cradle, slot means provided in said cradle to receive said roller means, portions of said roller means extending through said slots beyond the inner periphery of said cradle, said cradle means being movably mounted relative to said roller means, said roller means including magnetic rollers adapted to cause radial expansion of said article during rotative movement relative thereto, locating means cooperable with said roller means to locate said article in a predetermined manner on said roller means, and elevating means operable after said article has acquired said predetermined orientation to move said cradle relative to said rollers and support said article on said cradle in said predetermined oriented position.

9. The apparatus as defined in claim 8 and wherein said transfer means comprises jaw means movable between open and closed positions, carriage means for moving said jaw means between a retracted position and an extended position, cam means for opening and closing said jaw means in said extended position to grip and retain said annular article in said preoriented position.

10. The apparatus as defined in claim 7 and wherein said transfer means comprises: jaw means operable between open and closed positions, means for causing movement of said jaw means as a unit in said open position from a retracted position to an extended position, cam means to close said jaw means in said extended position, said cam means and said jaw means being movable by a single air cylinder, a piston rod extending from said air cylinder, a cam block mounted on the end of said piston rod and being movably mounted relative to said jaw means and to said upper jaw unit, lost motion means connecting said cam means and said jaw means, said lost motion means permitting movement of said jaw means to said extended position as said cam means is extended by said piston rod and prior to engagement of said cam means with said upper jaw means, and said cam means being engageable with said upper jaw means after full extension of said jaw means to said extended position to move said jaw means to said closed position.

11. Apparatus for radially expanding an annular workpiece and comprising: spaced shaft means, roller elements mounted on said shaft means, the peripheries of said rollers being located along an arc substantially corresponding to the periphery of said workpiece, magnetic means associated with said roller elements, and drive means drivingly connected to said roller elements on said shaft means to cause some of said roller elements to rotate in opposite directions and to create oppositely directed forces on said workpiece tending to cause radial expansion thereof.

12. Apparatus for transferring an annular workpiece havin open ends to a work station with a predetermined orientation relative thereto, and comprising: cradle means to receive and support said workpieces, feed means to feed said workpiece to said cradle means with a random orientation, magnetic roller means associated with said cradle means to cause radial expansion of said annular workpiece and to space the open ends thereof, blade means positionable between the spaced open ends of said annular workpiece to locate and maintain said workpiece in a predetermined position on said cradle means, elevator means to disassociate said workpiece from said magnetic roller means after said workpiece has acquired said predetermined position and to move said workpiece to a transfer position, clamping means to maintain said workpiece in said predetermined position during operation of said elevator means to said transfer position, alignment means operable in said transfer position to correct any misalignment of said workpiece in said predetermined position, and workpiece transfer mechanism operable to engage said workpiece in said transfer position and to carry said workpiece to said work station in said predetermined position and in proper alignment.

13. The apparatus as defined in claim 12 and wherein said workpiece is provided with locating notch means, said blade means comprising a roller element engageable with a side surface of said workpiece and receivable within said locating notch means provided thereon, roller drive means to rotate said roller means and impart rotary motion to said workpiece, and force applicator means connected to said roller element to maintain a constant pressure on said blade means against the side surface of said workpiece and prevent rotation of said workpiece after said roller means is received within said notch means.

14. The apparatus as defined in claim 12 and wherein said workpiece transfer mechanism comprises: jaw means operable between open and closed positions, means for causing movement of said jaw means as a unit in said open position from a retracted position to an extended position, cam means to close said jaw means in said extended position, said cam means and said jaw means being movable by a single air cylinder, a piston rod extending from said air cylinder, a cam block mounted on the end of said piston rod and being movably mounted relative to said jaw means and to said upper jaw unit, lost motion means connecting said cam means and said jaw means, said lost motion means permitting movement of said jaw means to said extended position as said cam means is extended by said piston rod and prior to engagement of said cam means with said upper jaw means, and said cam means being engageable with said upper jaw means after full extension of said jaw means to said extended position to move said jaw means to said closed position.

15. A machine for transferring a cylindrical metallic band having discontinuous but closely spaced end portions from a conveyor line to a welding station in a predetermined oriented condition with the side surfaces of the band aligned and with the end portions equally spaced a predetermined distance sufficient to produce a good weld seam therebetween during a subsequent welding operation and comprising: cradle means for a band movable between a band receiving position whereat bands are deliverable thereto from said conveyor line and a band discharging position whereat bands are removable therefrom, a substantially semi-cylindrical support surface provided by said cradle means and adapted to support a band during movement between the band receiving position and the band discharging position, a plurality of roller slots formed in said support surface, roller means fixedly mounted relative to said cradle means and being rotatably supported with portions extending through said slots and located to rotatably support a band in spaced relation to said support surface in the band receiving position, drive means for said roller means to cause rotation of some of said roller means in one direction and rotation of the other of said roller means in the opposite direction to apply oppositely directed forces to a band supported thereon causing radial expansion of the band and separation of the end portions, wedge means mounted adjacent said cradle means in the band receiving position and being movable between a retracted position spaced from a band supported by said roller means and an extended position engaging a side surface of the band and being receivable between the end portions of the band to locate the band in a predetermined position on said cradle means, blade means mounted on said cradle means and being movable between a retracted position spaced from a band supported by said roller means and an extended position extending between the end portions of the band and equally spacing the end portions a predetermined distance, elevator means for moving said cradle means relative to said roller means to engage said support surface with a band having the end portions spaced by said blade means and to thereafter move said cradle means and said blade means and the band supported thereon to said band discharging position, and jaw means operable in said band discharging position to grippingly engage the band and hold the band with the end portions equally spaced and to carry the band from said cradle means to the welding station.

16. The invention as defined in claim 15 and wherein said cradle means is provided with jaw actuating means adapted to receive and align said jaw means in the band discharging position and to actuate said jaw means to a closed gripping position holding the end portions of the band equally spaced apart.

17. The invention as defined in claim 15 and having spring biased abutment means mounted on said cradle opposite said jaw means to cause alignment of the side edges of the band during engagement with said jaw means.

18. The invention as defined in claim 15 and wherein at least some of said roller means are magnetic and spaced and arranged to create a force unbalance during rotation of said band relative thereto causing the end portions of the band to be skewed and forming a pocket at one side surface adjacent said end portions adapted to receive said wedge means.

References Cited by the Examiner

UNITED STATES PATENTS

| | | | |
|---|---|---|---|
| 1,371,833 | 3/21 | Youtsey et al. | 113—8 |
| 1,948,379 | 2/34 | Helle | 113—113 |
| 2,419,484 | 4/47 | Danziger | 113—59 XR |
| 2,580,502 | 1/52 | Anderson | 113—127 |
| 2,941,284 | 6/60 | McConnell | 29—240 |
| 3,026,838 | 3/62 | Sauder | 113—130 |
| 3,061,115 | 10/62 | Sharpe | 214—102 |

FOREIGN PATENTS 638,323   11/36   Germany.

CHARLES W. LANHAM, *Primary Examiner.*